US011918521B2

(12) United States Patent
Lee et al.

(10) Patent No.: US 11,918,521 B2
(45) Date of Patent: Mar. 5, 2024

(54) FOLDABLE RAMP

(71) Applicant: HUMAN TECHNOLOGY & COMPLEX CO., LTD, Gyeonggi-do (KR)

(72) Inventors: Dong Kwang Lee, Seoul (KR); Hee Sub Kim, Gyeonggi-do (KR); Sam Young Kim, Gyeonggi-do (KR)

(73) Assignee: HUMAN TECHNOLOGY & COMPLEX CO., LTD, Gyeonggi-do (KR)

(*) Notice: Subject to any disclaimer, the term of this patent is extended or adjusted under 35 U.S.C. 154(b) by 0 days.

(21) Appl. No.: 18/032,654

(22) PCT Filed: Sep. 15, 2022

(86) PCT No.: PCT/KR2022/013763
§ 371 (c)(1),
(2) Date: Apr. 19, 2023

(87) PCT Pub. No.: WO2023/043212
PCT Pub. Date: Mar. 23, 2023

(65) Prior Publication Data

US 2023/0390129 A1 Dec. 7, 2023

(30) Foreign Application Priority Data

Sep. 16, 2021 (KR) ........................ 10-2021-0123889
Sep. 14, 2022 (KR) ........................ 10-2022-0115550

(51) Int. Cl.
*A61G 3/06* (2006.01)

(52) U.S. Cl.
CPC .................................... *A61G 3/063* (2013.01)

(58) Field of Classification Search
CPC ................................ B65G 69/30; A61G 3/063
See application file for complete search history.

(56) References Cited

U.S. PATENT DOCUMENTS

| | | | | |
|---|---|---|---|---|
| 963,918 A * | 7/1910 | Miller | B65G 69/30 | 193/41 |
| 3,818,528 A * | 6/1974 | Petersen | B65G 69/30 | 414/537 |
| 6,447,040 B1 * | 9/2002 | Young, Sr. | B60P 1/435 | 296/61 |
| 6,718,588 B1 * | 4/2004 | Frederiksen | E04F 11/002 | 404/35 |
| 8,448,278 B1 * | 5/2013 | Beilstein | B65G 69/30 | 414/537 |

(Continued)

FOREIGN PATENT DOCUMENTS

| | | |
|---|---|---|
| KR | 10-2145258 B1 | 8/2020 |
| KR | 10-2021-0000628 A | 1/2021 |
| KR | 10-2021-0055412 A | 5/2021 |

OTHER PUBLICATIONS

International Search Report for PCT/KR2022/013763 dated Dec. 13, 2022.

*Primary Examiner* — Abigail A Risic
(74) *Attorney, Agent, or Firm* — The PL Law Group, PLLC

(57) ABSTRACT

A foldable ramp according to an embodiment is configured to assist a movement of means of transportation which may be used by disabled people, such as a wheelchair. The foldable ramp may be used as a stand for a billboard, and the foldable ramp may be unfolded to be used as a ramp.

1 Claim, 12 Drawing Sheets

(56) References Cited

U.S. PATENT DOCUMENTS

| | | | | |
|---|---|---|---|---|
| 9,279,221 | B1 * | 3/2016 | Orona | E01D 15/124 |
| 2007/0212206 | A1 * | 9/2007 | Milne | A61G 3/063<br>414/545 |
| 2010/0197416 | A1 | 8/2010 | Brown | |
| 2014/0271100 | A1 * | 9/2014 | Giemza | B65G 69/30<br>414/813 |
| 2022/0325484 | A1 * | 10/2022 | Batchelder | E01D 15/124 |

* cited by examiner

FOLDABLE RAMP

CROSS REFERENCE TO RELATED APPLICATIONS AND CLAIM OF PRIORITY

This application claims benefit under 35 U.S.C. 119(e), 120, 121, or 365(c), and is a National Stage Entry from International Application No. PCT/KR2022/013763, filed Sep. 15, 2022, which claims priority to the benefit of Korean Patent Application Nos. 10-2021-0123889 filed on Sep. 16, 2021, and 10-2022-0115550 filed on Sep. 14, 2022 in the Korean Intellectual Property Office the entire contents of which are incorporated herein by reference.

BACKGROUND

1. Technical Field

The present invention relates to a foldable ramp which assists movement of means of transportation used by disabled people, such as a wheelchair, and more specifically, to a foldable ramp which is usually used as a stand for a billboard and can be unfolded when used as a ramp.

2. Background Art

In general, a wheelchair is a means of transportation formed so that a person who is not free to move can move while sitting, and includes a seat portion fixed to a pipe-shaped frame, a front wheel, a main wheel, a steering handle, and the like. The wheelchair may be classified as a guardian operation type and a user operation type. In addition, the wheelchair may be classified as a power-driven traveling type and a guardian or user driving type. All of these wheelchairs are used to travel a road, a sidewalk, or an indoor space by driving the front wheel and the main wheel in a state in which one person is on board. Meanwhile, the main wheel is formed to have a large size, but the front wheel is formed to have a diameter smaller than that of the main wheel in order to improve steering performance during traveling.

When there is an obstacle such as a berm or a step while traveling on a sidewalk or an indoor space, the wheelchair requires a lot of force to move over the obstacle, in particular, when the wheelchair encounters an obstacle such as a low staircase or a step, it cannot go up or down the obstacle.

In addition, in order to solve the problems, a foldable ramp is introduced, but since the foldable ramp has to be usually stored in a separate storage space, a problem that maintenance thereof is difficult has been raised.

SUMMARY

The technical problem to be solved by the present invention is to provide a foldable ramp which is easily moved and stored and is usually used as a stand for a billboard.

To achieve the technical problem, the present invention relates to a foldable ramp which is stored in a folded state when not in use and is mounted on a place with a step in an unfolded state when in use, and the foldable ramp includes: a folding guide portion which forms an inclination surface; a first inclination portion which has one side rotatably coupled to one side of the folding guide portion to form the inclination surface together with the folding guide portion; a first support portion which has one side rotatably coupled to the other side of the first inclination portion and is supported by a floor; a second inclination portion which has one side rotatably coupled to the other side of the folding guide portion to form the inclination surface together with the folding guide portion and the first inclination portion; and a second support portion which has one side rotatably coupled to the other side of the second inclination portion and is supported by the step, wherein, when being folded, the foldable ramp is folded by a width corresponding to a width of the folding guide portion.

In addition, a plurality of holes may be formed in the folding guide portion, the first inclination portion, and the second inclination portion, and an advertisement display portion may be coupled through the holes.

In addition, the foldable ramp may further include a reinforcement portion which has an upper part coupled to at least one of the folding guide portion, the first inclination portion, and the second inclination portion, and a lower part supported by the floor.

In addition, the foldable ramp may further include a mounting portion into which the folding guide portion, the first inclination portion, the first support portion, the second inclination portion, and the second support portion are inserted and supported while being folded, wherein a transfer unit is disposed under the mounting portion.

In addition, the mounting portion may have a drain hole formed from a top to a bottom of the mounting portion.

The present invention described above has the following effects.

First, the present invention can be easily stored and carried because it has a foldable body.

In addition, the present invention can display various guides because the advertisement display portion can be used in a detachable manner.

In addition, the present invention can firmly support the ramp through the reinforcement portion, and can be installed by easily adjusting a height thereof according to an inclination angle through a height adjustment unit.

In addition, the present invention has the mounting portion so that it is possible to facilitate the storage and transport of the foldable ramp.

DETAILED DESCRIPTION

Figure 1:
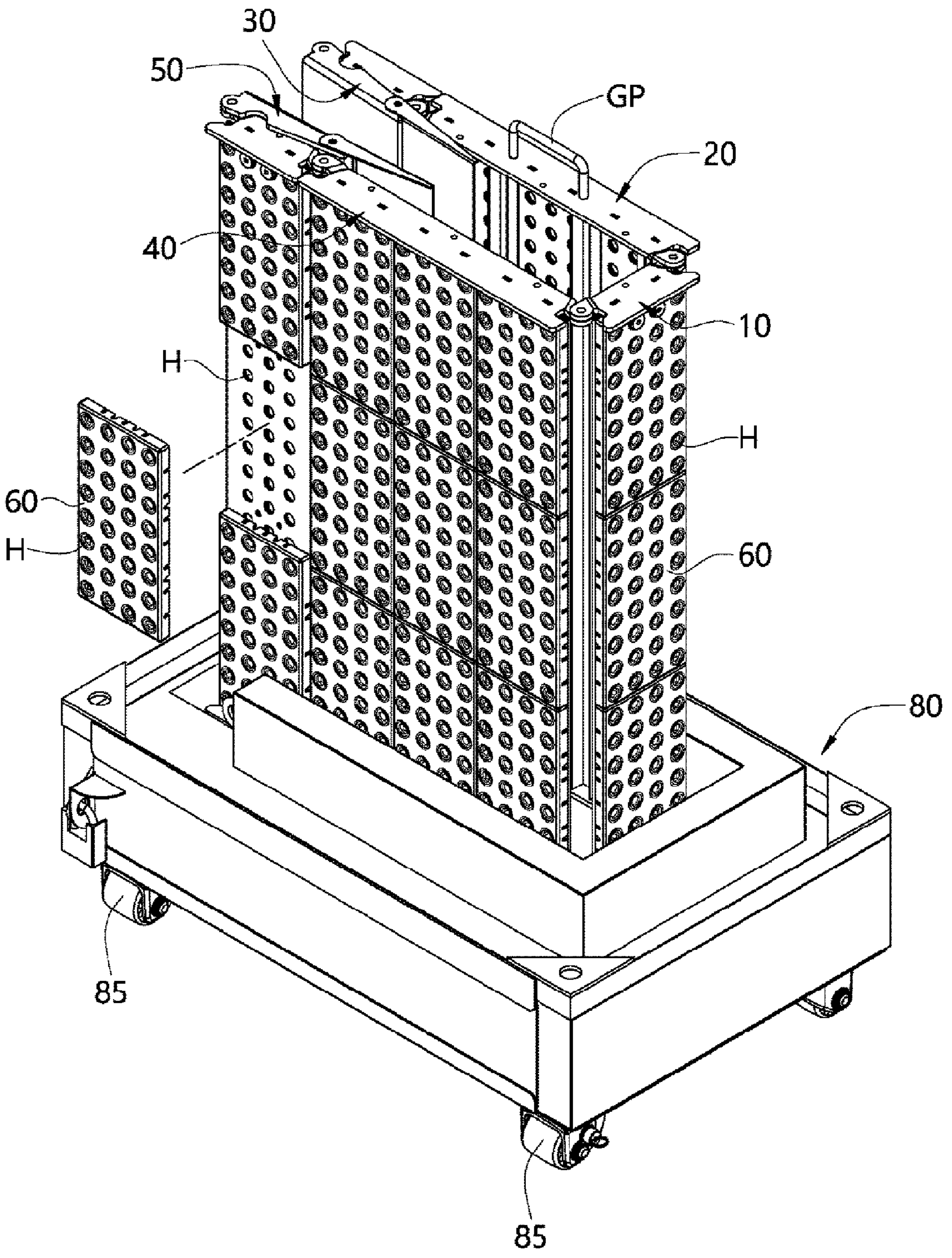
FIG. 1 is a perspective view illustrating a mounting state of a foldable ramp according to one embodiment of the present invention.

Hereinafter, some embodiments of the present invention will be described in detail with reference to exemplary drawings. It should be noted that in assigning reference numerals to elements in the drawings, the same components will be designated by the same reference numerals although they are illustrated in different drawings. Further, in the following description of the present invention, a detailed description of known configurations and functions incorporated herein will be omitted when it may make the subject matter of the present invention rather unclear.

In addition, in describing components of the embodiments of the present invention, the terms like "first," "second," "A," "B," "(a)," and "(b)" may be used. These terms are merely for differentiating one component from another component, and the essence, sequence, or order of a corresponding component is not limited by the terms. It will be understood that when a component is described as being "connected", "coupled", or "linked" to another component, the another component may be directly connected or linked to the other component, but the other component may be "connected", "coupled", or "linked" between the respective components.

Figure 2:
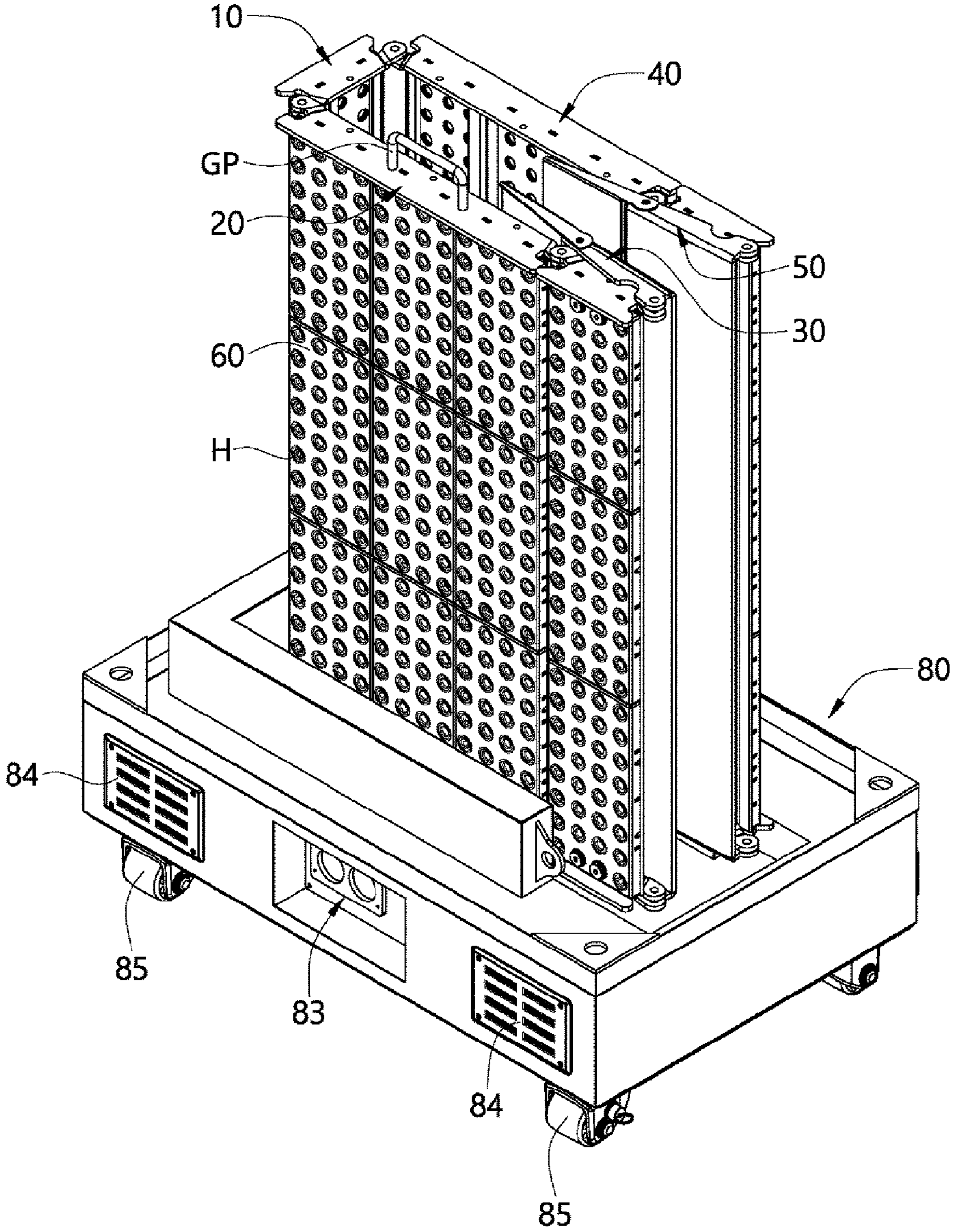
FIG. 2 is a rear perspective view of FIG. 1.
Figure 3:
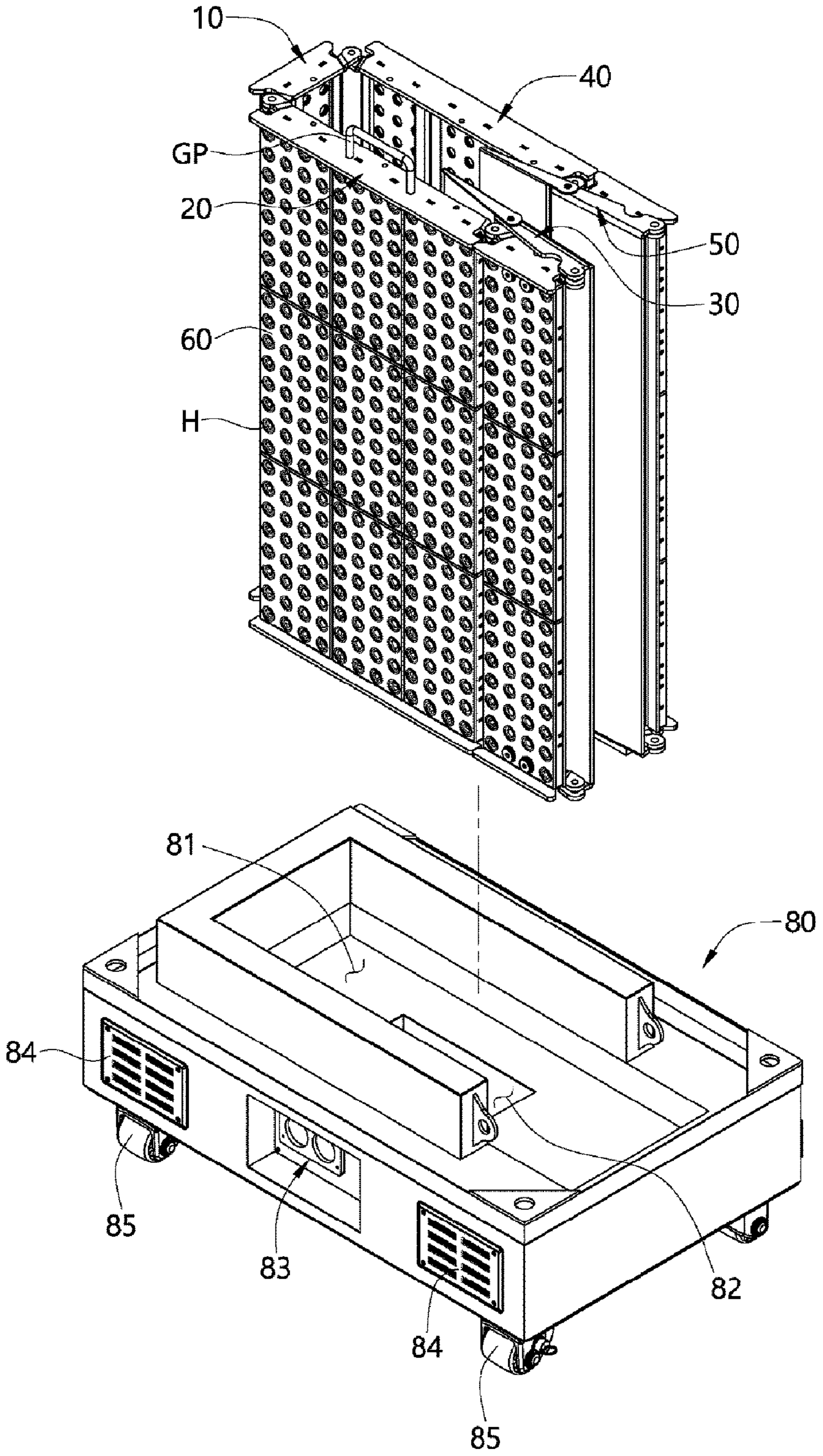
FIG. 3 is an exploded perspective view of an inclination plate that is separated from a mounting portion according to the present invention.
Figure 4:
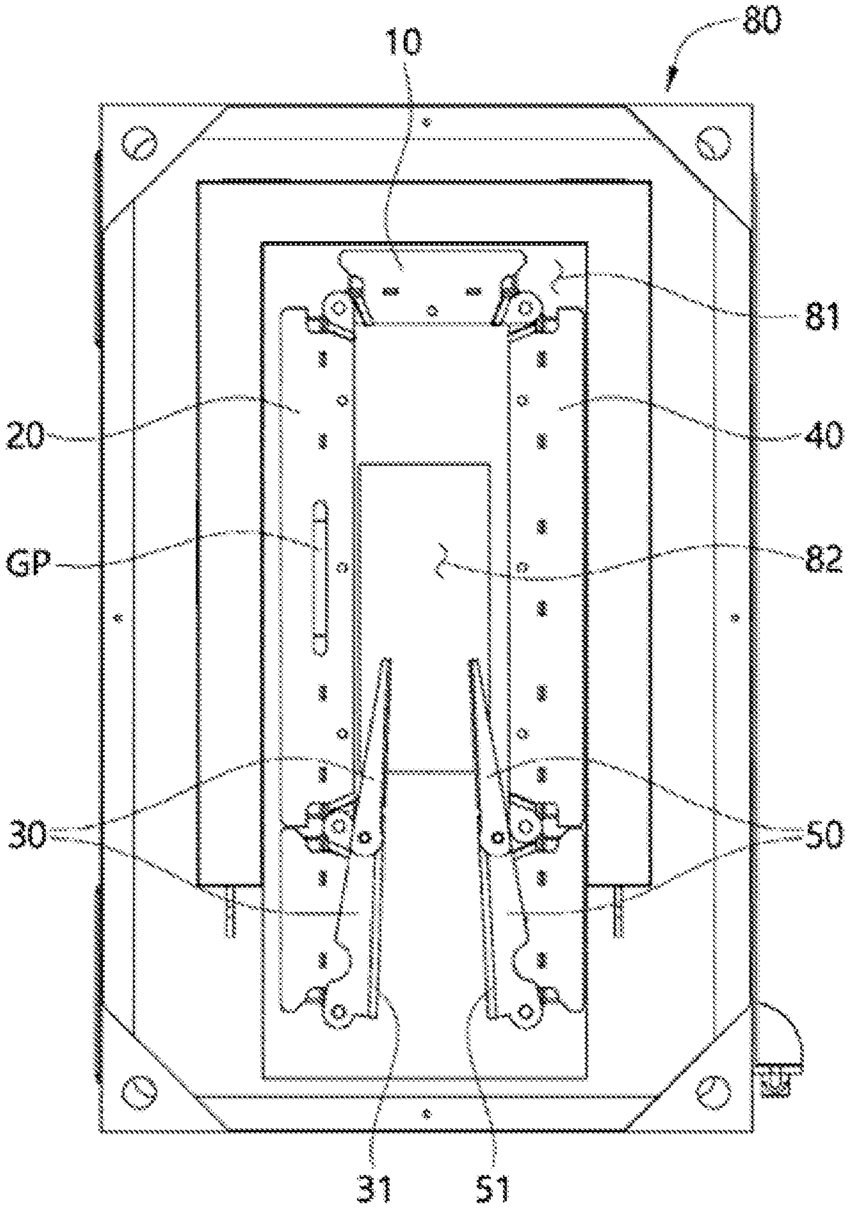
FIG. 4 is a plan view of FIG. 1.
Figure 5:
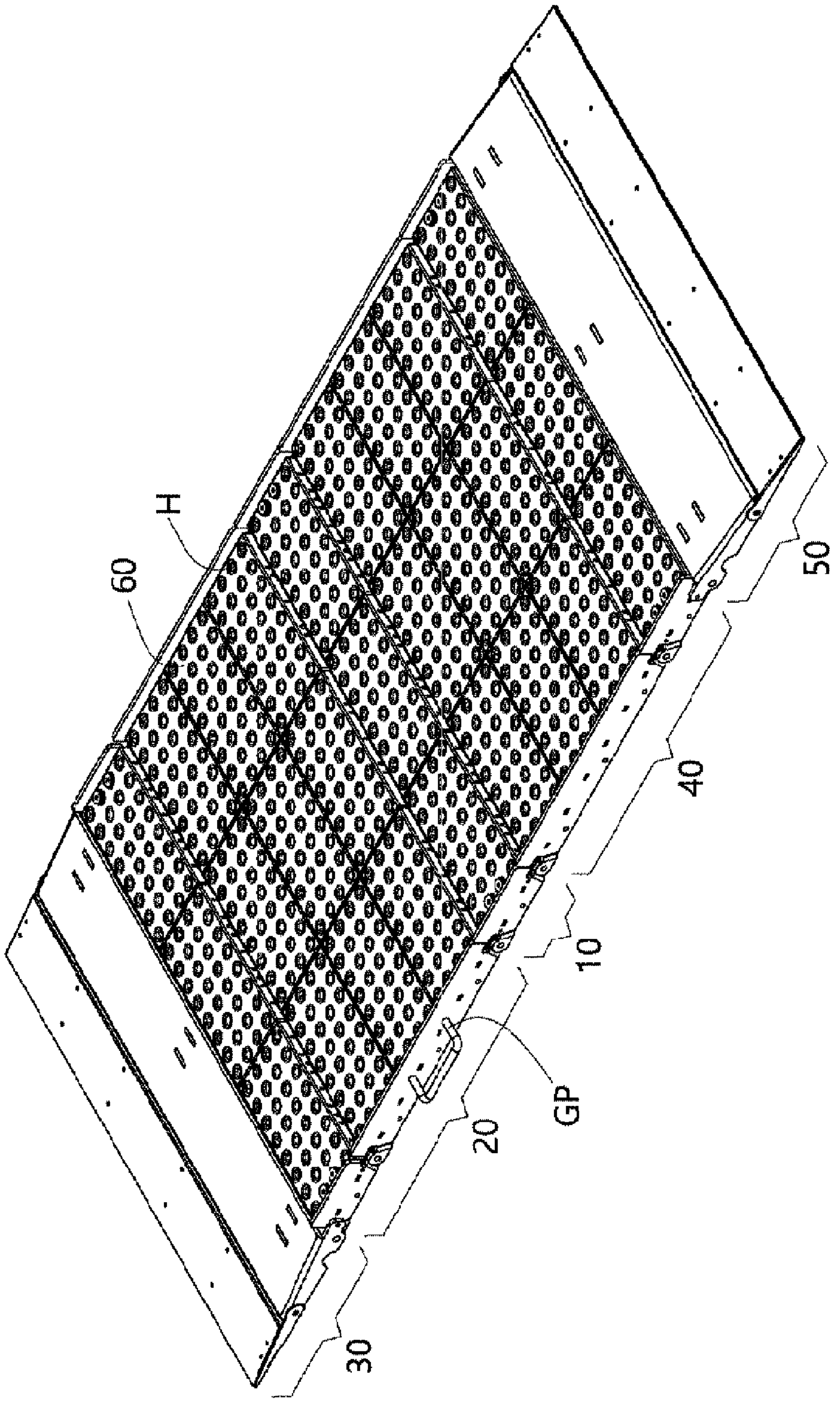
FIG. 5 is a perspective view illustrating an unfolded state of the inclination plate according to the present invention.
Figure 6:
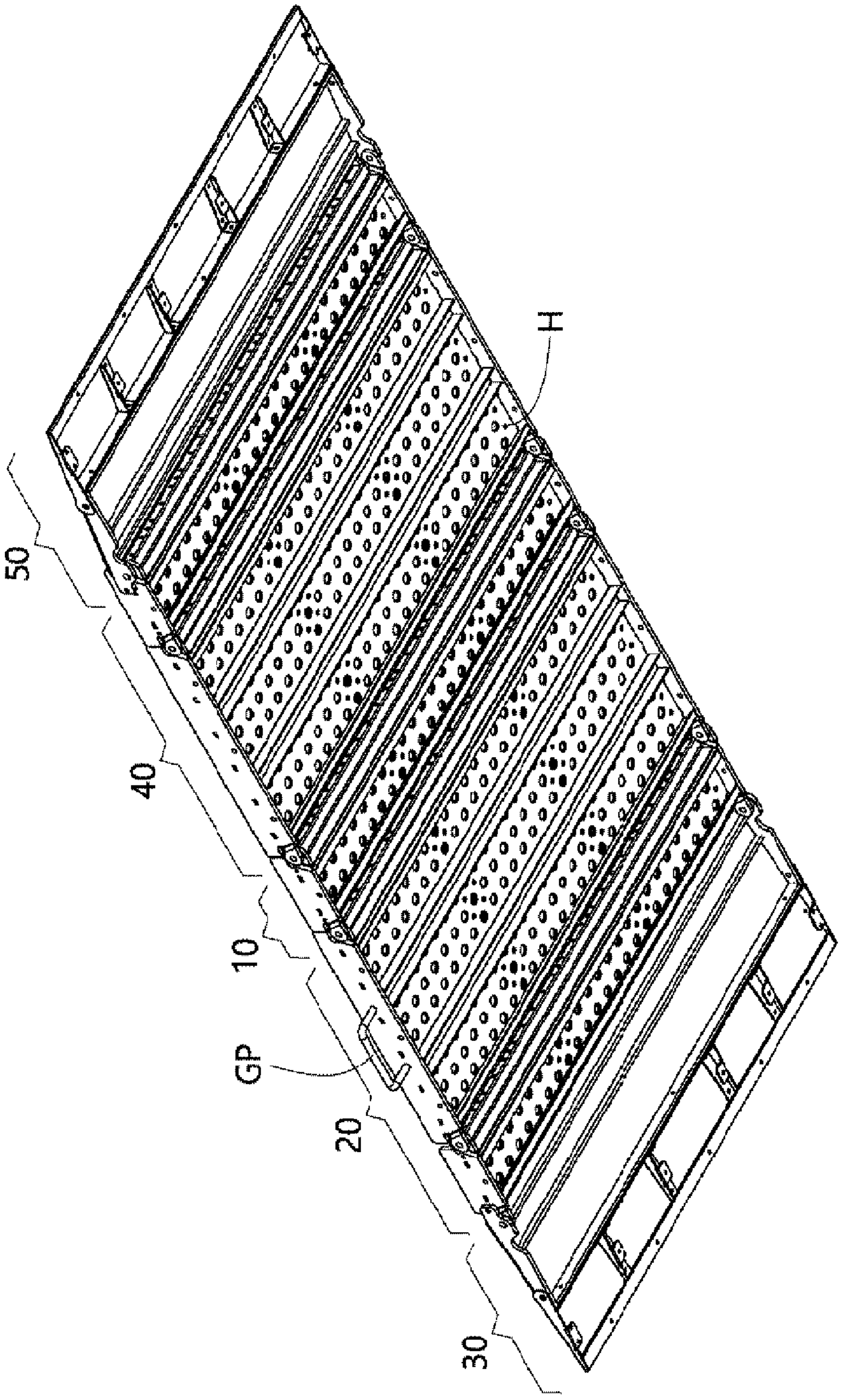
FIG. 6 is a bottom perspective view of FIG. 5.

FIG. 1 is a perspective view illustrating a mounting state of a foldable ramp according to one embodiment of the present invention, FIG. 2 is a rear perspective view of FIG. 1, FIG. 3 is an exploded perspective view of an inclination plate that is separated from a mounting portion according to the present invention, FIG. 4 is a plan view of FIG. 1, FIG. 5 is a perspective view illustrating an unfolded state of the inclination plate according to the present invention, and FIG. 6 is a bottom perspective view of FIG. 5.

First, a structure of the foldable ramp according to the present invention will be described with reference to FIGS. 1 to 6, and for convenience, a part illustrated in FIGS. 5 and 6 will be referred to as an "inclination plate".

The foldable ramp according to the present invention may largely include the inclination plate described above and a mounting portion 80. When not in use, the inclination plate may be stored in the mounting portion while being folded as illustrated in FIGS. 1 to 4. In addition, when in use, the inclination plate may be used while being unfolded as illustrated in FIGS. 5 and 6.

The inclination plate according to the present invention may include a folding guide portion 10, a first inclination portion 20, a first support portion 30, a second inclination portion 40, and a second support portion 50.

The folding guide portion 10 may form an inclination surface, and may be formed to have a width corresponding to a folding width when the inclination plate is folded.

The first inclination portion 20 may have one side rotatably coupled to one side of the folding guide portion 10 to form the inclination surface together with the folding guide portion 10 while being unfolded.

The first support portion 30 is a portion which is rotatably coupled to the other side of the first inclination portion 20 and is supported by a floor, on which the first support portion 30 is installed, while being unfolded.

The second inclination portion 40 may have one side rotatably coupled to the other side of the folding guide portion 10 to form the inclination surface together with the folding guide portion 10 and the first support portion 30 while being unfolded.

The second support portion 50 is a portion which is rotatably coupled to the other side of the second inclination portion 40 and is supported by a step, on which the second support portion 50 is installed, while being unfolded.

When the inclination plate is folded, the inclination plate may be folded by a width corresponding to a width of the folding guide portion 10, and may be stored while being inserted into the mounting portion 80, and when in use, the inclination plate may be unfolded and mounted on a place with a step or the like.

A plurality of holes H may be formed in the inclination plate. Water may be drained through the holes H, and an advertisement display portion to be described later may be used in a detachable manner through the holes H. In addition, a block-type inclination plate 60 may be coupled through the holes H. Holes H, which correspond to the plurality of holes H formed in the inclination plate, may be formed in the block-type inclination plate 60. The block-type inclination plate 60 and the inclination plate may be coupled to each other through separate fastening units (not illustrated), or by inserting fitting protrusions (not illustrated) formed on the block-type inclination plate, or the like into the holes H formed in the inclination plate. As illustrated in FIG. 1, the block-type inclination plate 60 may be used to combine several small plates, or may have a size corresponding to each of a large plate, for example, the folding guide portion 10, the first inclination portion 20, the first support portion 30, the second inclination portion 40, and the second support portion 50. In addition, the holes H formed in the block-type inclination plate 60 may perform an anti-slip function.

A transfer unit 85 may be disposed under the mounting portion 80 into which the folded inclination plate is inserted and supported. The inclination plate may be easily moved to a place where the inclination plate is to be used in a coupled state through the transfer unit 85, and a stopper is provided on the transfer unit 85 so that the inclination plate may be used while being fixed so as not to be moved. In addition, a drain hole 82 may be formed in the center of the mounting portion 80 from a top to a bottom, so that it is possible to prevent rainwater or the like from stagnating through the drain hole 82.

Figure 7:
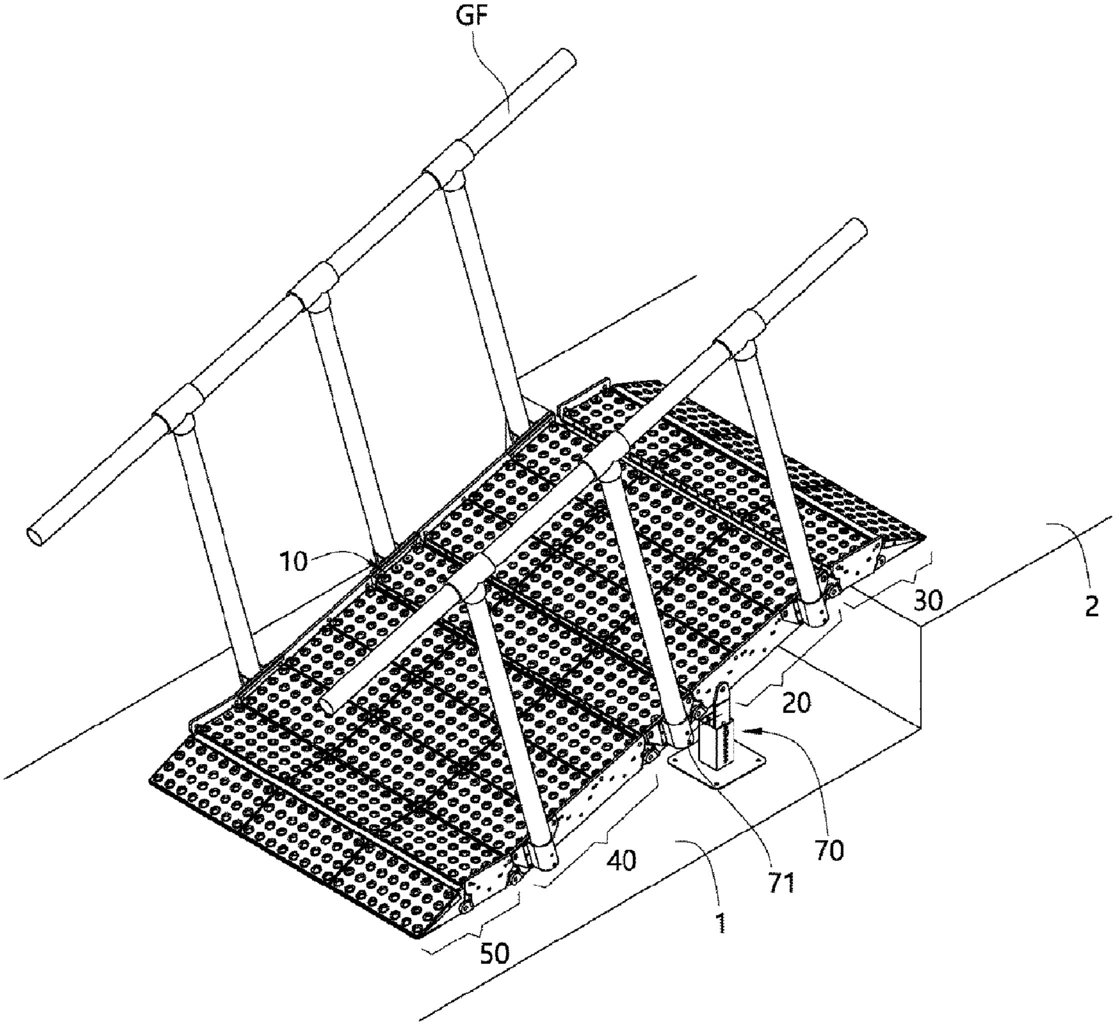
FIG. 7 is a view illustrating a state in which the inclination plate is installed on a floor with a step according to one embodiment of the present invention.
Figure 8:
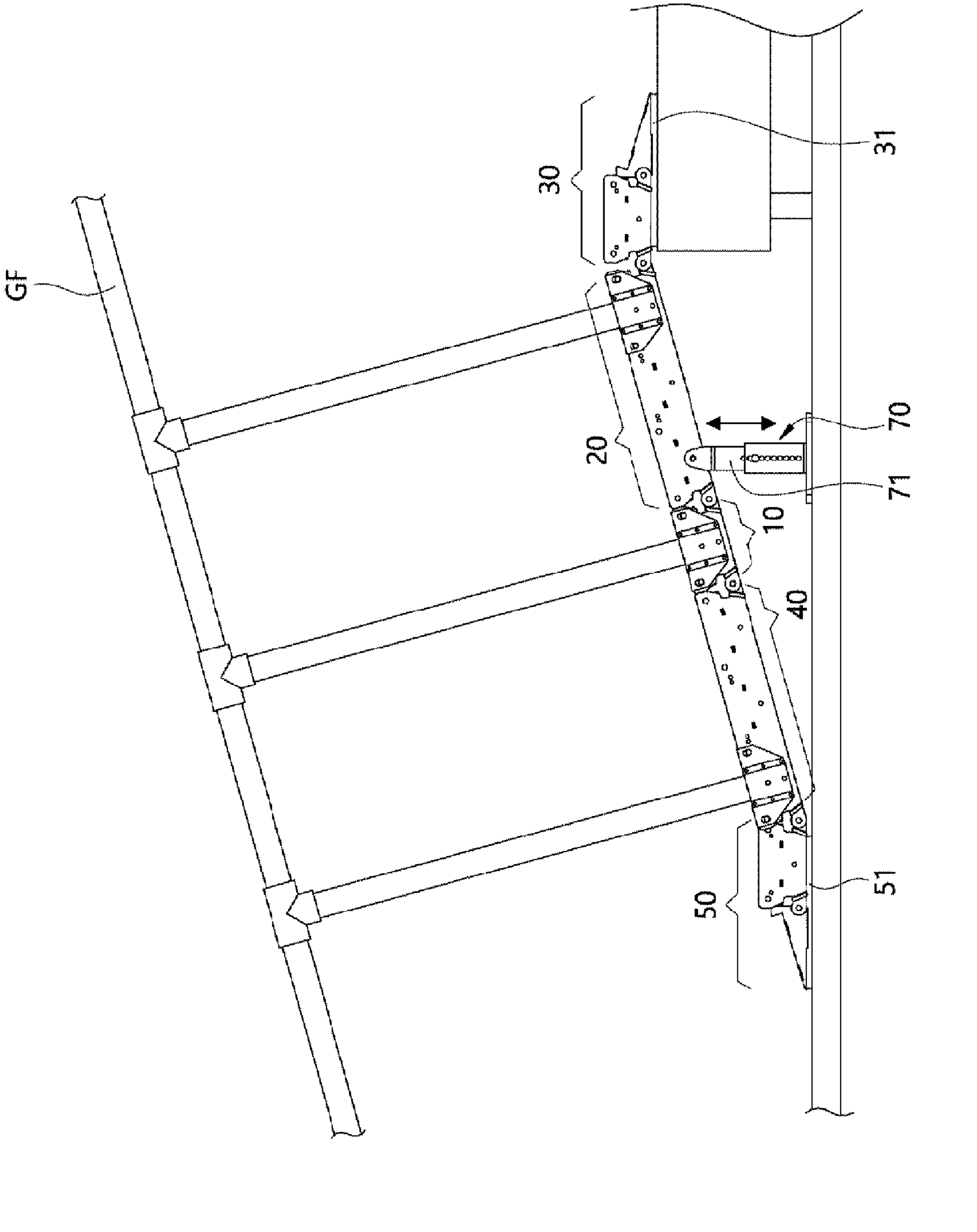
FIGS. 8 and 9 are views illustrating a usage state of a reinforcement portion according to one embodiment of the present invention.
Figure 9:
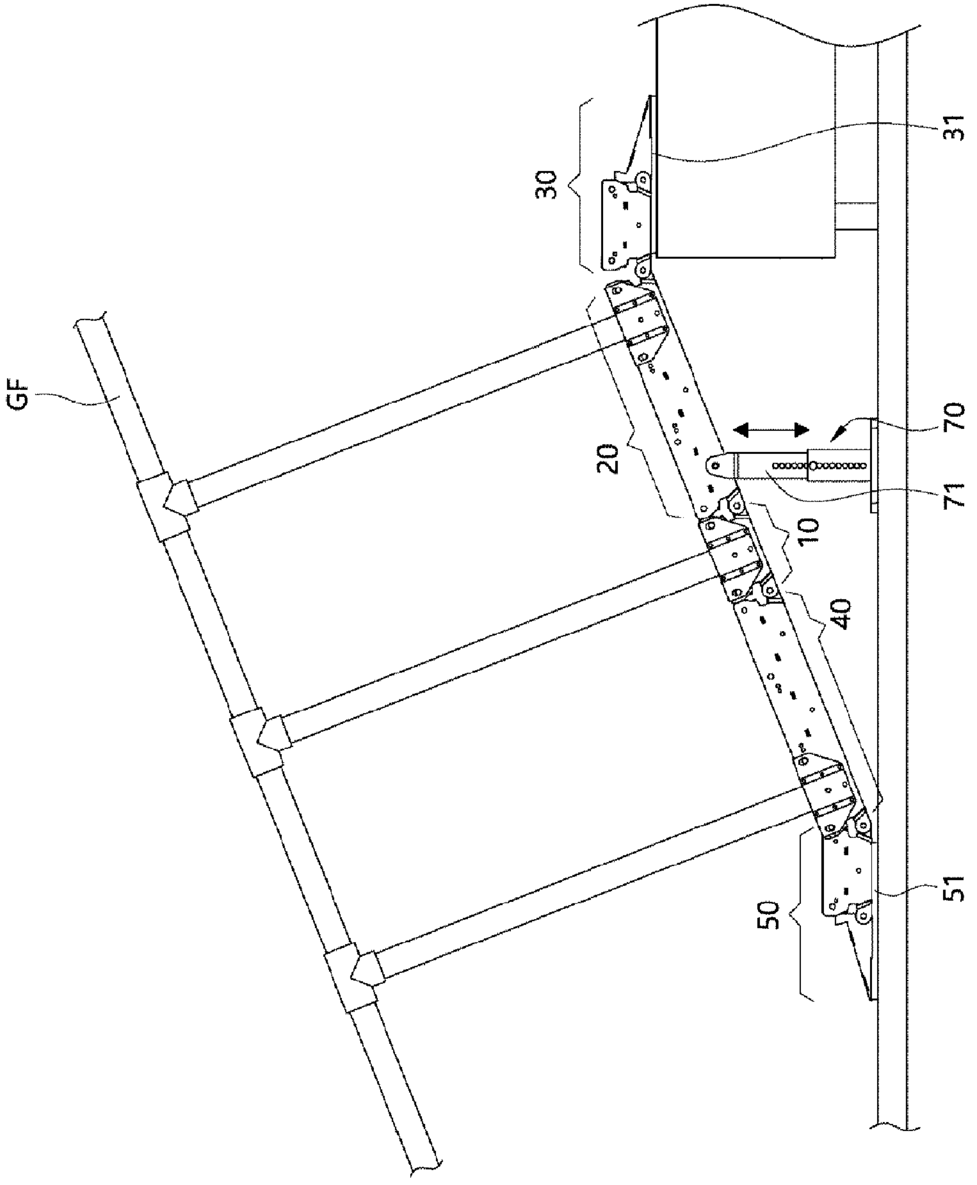

FIG. 7 is a view illustrating a state in which the inclination plate is installed on a floor with a step according to one embodiment of the present invention, and FIGS. 8 and 9 are views illustrating a usage state of a reinforcement portion according to one embodiment of the present invention.

Referring to FIGS. 7 to 9, a plurality of holes (no reference numeral) may be formed in both side surfaces of the inclination plate. The formed holes may be used by further combining a guide frame GF that may be gripped by users using the inclination plate.

In addition, a reinforcement portion 70 may be used by being further coupled to at least one of the folding guide portion 10, the first inclination portion 20, and the second inclination portion 40. The reinforcement portion 70 may also be used by being coupled through the holes formed on both side surfaces of the inclination plate.

A pair of reinforcement portions 70 may be coupled to both sides of the inclination plate so as to prevent the inclination plate from being bent due to a load applied to the inclination plate and to reinforce the strength of the inclination plate. The reinforcement portion 70 may be provided with a height adjustment unit 71. The height adjustment unit 71 may include fitting protrusions (no reference numeral) fastened to and supported by fitting holes (no reference numeral) formed at predetermined intervals, and since such a structure itself is known in the art, a detailed description thereof will be omitted. As illustrated in FIGS. 8 and 9, the height adjustment unit 71 may be used to adjust a height of the reinforcement portion 70 corresponding to an inclination angle at which the inclination plate is to be installed.

In addition, anti-slip pads 31 and 51 made of a urethane material may be further coupled to a portion that is in contact with and supported by a floor 1 of the first support portion 30 and a portion supported by a floor on an upper part of the step 2 of the second support portion 30. The urethane material may also be applied to the block-type inclination plate 60 described above, and may secure a predetermined contact support force through the anti-slip pads 31 and 51, thereby preventing movement of the inclination plate when the inclination plate is used. In addition, although not illustrated, the above-described anti-slip pads may be coupled to a portion that is in contact with and supported by the floor of the reinforcement portion 70.

Figure 10:
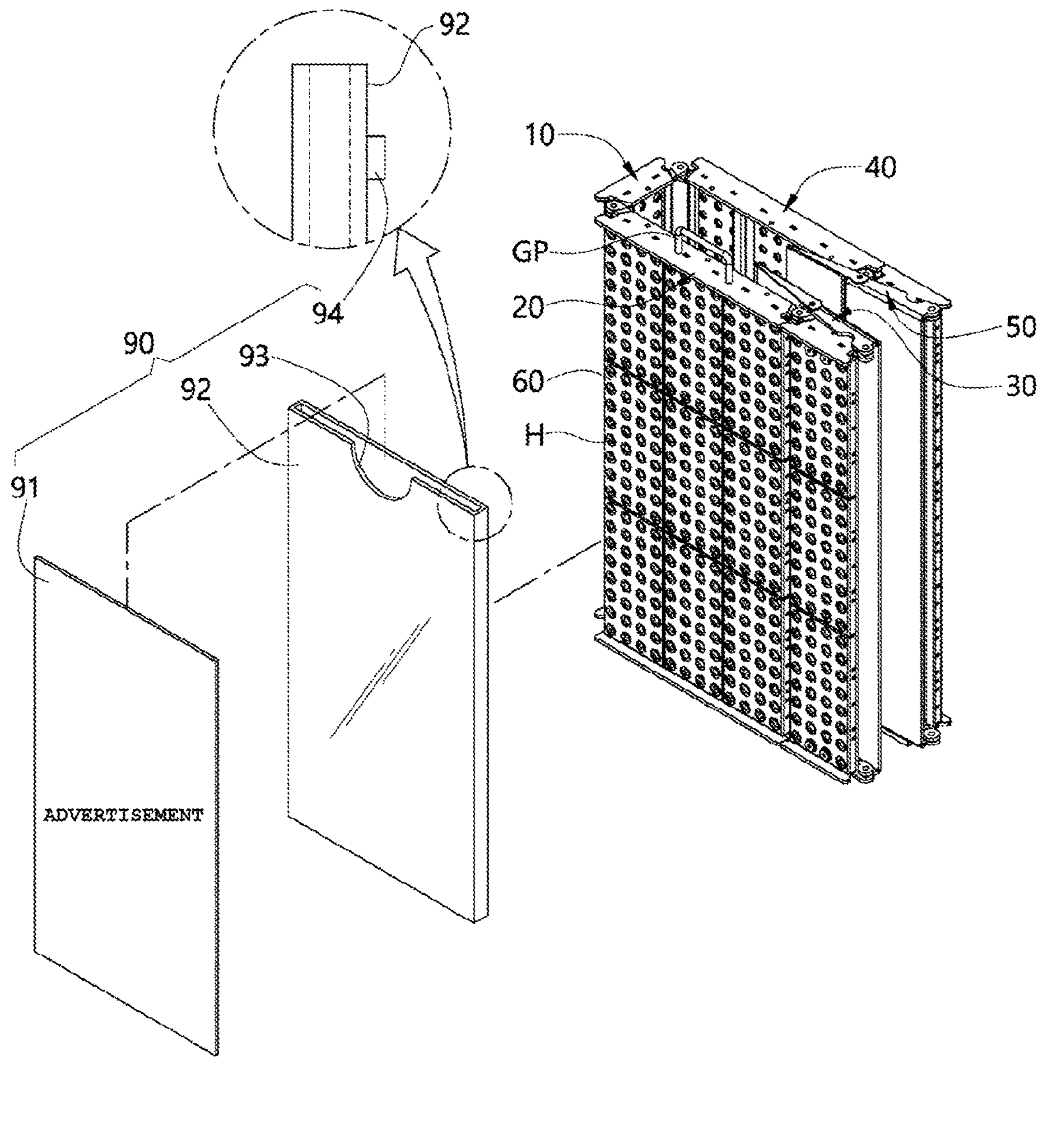
FIGS. 10 and 11 are exploded perspective views of an advertisement display portion and the inclination plate according to the present invention.
Figure 11:
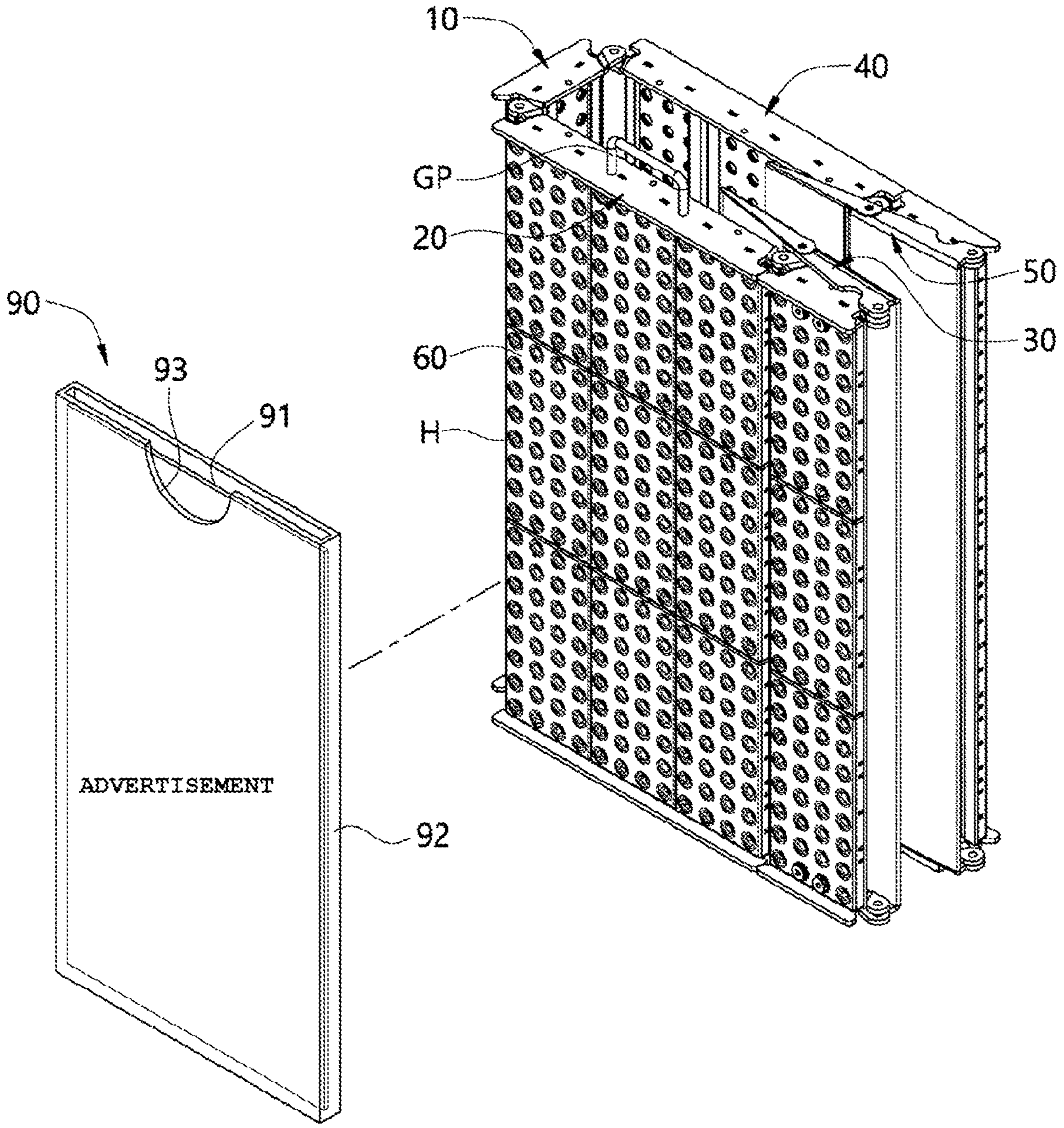
Figure 12:
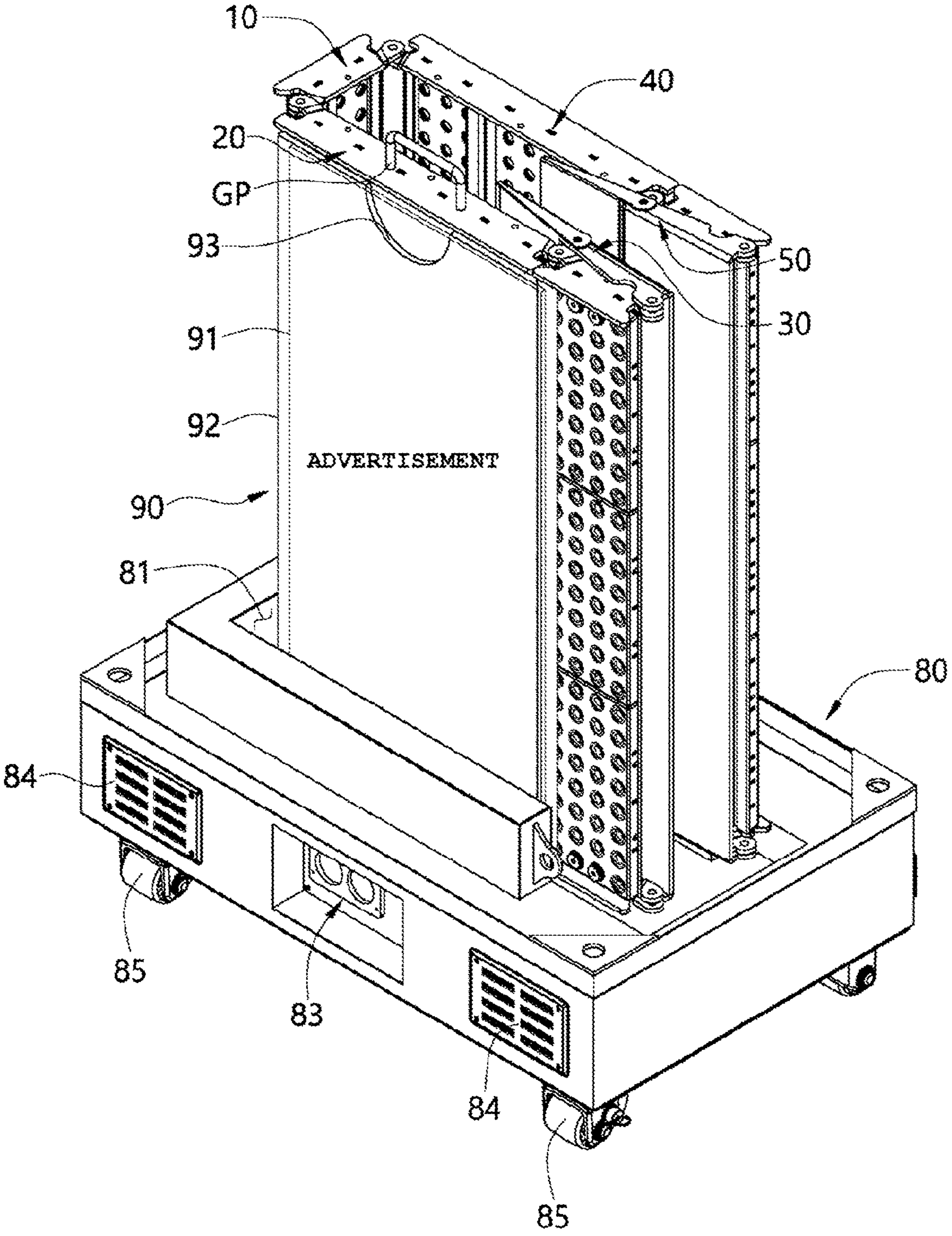
FIG. 12 is a view illustrating a state in which the inclination plate having the advertisement display portion installed thereon is mounted on a mounting portion.

FIGS. 10 and 11 are exploded perspective views of the advertisement display portion and the inclination plate according to the present invention, and FIG. 12 is a view illustrating a state in which the inclination plate having the advertisement display portion installed thereon is mounted on the mounting portion according to one embodiment of the present invention.

Referring to FIGS. 10 and 11, the advertisement display portion 90 may be used by being coupled to the holes H formed in the inclination plate. That is, the inclination plate is stored by being mounted on the mounting portion 80 while being folded when not in use, in this case, the advertisement display portion 90 may be fitted into the holes H formed in the inclination plate as an advertisement display board.

To this end, the advertisement display portion 90 may include an accommodation case 92 for accommodating the advertisement display board 91, a gripping groove 93, and a fastening protrusion 94.

The advertisement display board 91 may include a text, a picture, a photograph, or the like of various guidance signs including a general advertising sign, a guidance note, or the like.

The accommodation case 92 may have a size and a shape corresponding to the advertisement display board 91, and may have a fitting hole (not illustrated) formed at an upper part thereof such that the advertisement display board 91 is fitted into the accommodation case 92. In addition, the accommodation case 92 may be made of a transparent material such that the accommodated advertisement display board 91 may be distinguished. Further, the gripping groove 93 may be formed in an upper portion of one side surface of the accommodation case 91 to accommodate the advertisement display board 91 and to grip and take out the accommodated advertisement display board 91. In addition, a plurality of fastening protrusions 94, which are supported by being fitted into the holes H formed in the inclination plate, may be formed on the other side surface of the accommodation case 92, for example, one fastening protrusion 94 may be formed at each corner portion on the other side surface of the accommodation case 92.

When the inclination plate having the advertisement display portion 90 installed thereon is used, as illustrated in FIG. 12, the inclination plate may be used while being inserted into and supported by a support groove 81 formed in an upper part of the mounting portion 80.

In a state in which the advertisement display portion 90 is installed on the inclination plate, the inclination plate may be used by moving the mounting portion 80 using the transfer unit 85. In this case, a power connection member 83 may be formed on the mounting portion 80, and a lamp (not illustrated), a speaker (not illustrated), or the like may be used by installing and connecting the lamp or the speaker on and to at least one of the mounting portion 80 and the inclination plate by supplying power using the power connection member 83.

In addition, the mounting portion 80 may further include a ventilation hole 84 communicating with an empty space formed inside thereof. Meanwhile, although not illustrated, peripheral portions of four sides of the mounting portion 80 may be configured to form a sliding-type opening/closing door with a locking device.

According to the present invention described above, a user can use a ramp without the need for installing a separate ramp facility because the ramp has excellent storage properties, portability, and mobility, and the ramp can be normally used as a stand for a billboard, thereby remarkably improving user convenience and efficiency.

Hereinafter, even when all the components constituting the embodiment of the present invention are described as being coupled to each other or operated in combination as one, the present invention is not necessarily limited to the embodiment. That is, within the scope of the present invention, one or more of all of the components may be selectively combined with each other to be operated. In addition, the terms such as "comprise", "include", or "have" described above mean that corresponding components may be present unless otherwise stated, so the terms should be construed that other components may not be excluded, but further be included. All terms, including technical or scientific terms, have the same meaning as commonly understood by a person of ordinary skill in the technical field to which the present invention belongs, unless otherwise defined. Generally used terms, such as terms defined in a dictionary, should be interpreted as being consistent with the contextual meaning of the related technology, and should not be interpreted in an ideal meaning or an excessively formal meaning unless explicitly defined in the present invention.

The above description illustrates the technical idea of the present invention, and it will be understood by those skilled in the art to which the present invention belongs that various changes and modifications may be made without departing from the scope of the essential characteristics of the present invention. Therefore, the embodiments disclosed herein are not used to limit the technical idea of the present invention, but to explain the present invention, and the scope of the technical idea of the present invention is not limited by those embodiments. The scope of protection of the present invention should be defined by the following claims, and all technical spirits falling within the scope equivalent thereto should be construed as being included in the scope of the present invention.

What is claimed is:

1. A foldable ramp which is configured to be used as a stand for a billboard as well as a ramp, the foldable ramp in an unfolded state configured to be mounted on a place with a step when used as the ramp, the foldable ramp comprising:

a folding guide portion which forms an inclination surface;

a first inclination portion which has one side rotatably coupled to one side of the folding guide portion to form the inclination surface together with the folding guide portion;

a first support portion which has one side rotatably coupled to the other side of the first inclination portion supported by a floor and has an anti-slip pad coupled to a portion supported by the floor;

a second inclination portion which has one side rotatably coupled to the other side of the folding guide portion to form the inclination surface together with the folding guide portion and the first inclination portion; and a second support portion which has one side rotatably coupled to the other side of the second inclination portion and supported by an upper part of the step, and has an anti-slip pad coupled to a portion supported by the step;

a reinforcement portion which has an upper part coupled to at least one of the folding guide portion, the first inclination portion, and the second inclination portion, a lower part supported by the floor, and being height-adjustable; and a mounting portion into which the folding guide portion, the first inclination portion, the first support portion, the second inclination portion, and the second support portion are inserted and supported while being folded, wherein a transfer unit is disposed under the mounting portion, and is folded by a width corresponding to a width of the folding guide portion while being folded, wherein a plurality of holes are formed in the folding guide portion, the first inclination portion, and the second inclination portion, and an advertisement display portion is coupled through the holes, wherein the advertisement display portion which has fitting holes inserting a advertisement display board to upper portion and made of a transparent material, a gripping groove formed in an upper portion of one side surface of an accommodation case to accommodate the advertisement display board or to grip and take out the accommodated advertisement display board, and the accommodation case formed in a plurality of fastening protrusions supported by being fitted into the holes on the other side surface, wherein the mounting portion which has a drain hole formed from a top to a bottom;

a power connection member to supply power;

a speaker by supplying power through the power connection member; and a ventilation hole communicating with an empty space formed inside thereof.

* * * * *